(12) United States Patent
Mandić et al.

(10) Patent No.: US 11,379,877 B2
(45) Date of Patent: Jul. 5, 2022

(54) MEASURING EFFECTIVENESS OF IMAGES DISPLAYED ON A MOVING OBJECT

(71) Applicant: Skopus Media Inc., Redondo Beach, CA (US)

(72) Inventors: Marko Mandić, San Francisco, CA (US); Uroš Petrović, Belgrade (RS)

(73) Assignee: SKOPUS MEDIA INC., Redondo Beach, CA (US)

( * ) Notice: Subject to any disclaimer, the term of this patent is extended or adjusted under 35 U.S.C. 154(b) by 170 days.

(21) Appl. No.: 16/555,502

(22) Filed: Aug. 29, 2019

(65) Prior Publication Data
US 2021/0065240 A1 Mar. 4, 2021

(51) Int. Cl.
*G06Q 30/00* (2012.01)
*G06Q 30/02* (2012.01)

(52) U.S. Cl.
CPC ..... *G06Q 30/0265* (2013.01); *G06Q 30/0261* (2013.01)

(58) Field of Classification Search
None
See application file for complete search history.

(56) References Cited

U.S. PATENT DOCUMENTS

| | | | |
|---|---|---|---|
| 2008/0189168 A1* | 8/2008 | Kaplan | G06Q 30/02 705/7.34 |
| 2013/0339140 A1* | 12/2013 | Pokorny | G06Q 30/0242 705/14.49 |
| 2018/0276706 A1* | 9/2018 | Hoffman | G06Q 30/02 |
| 2018/0300746 A1* | 10/2018 | Terzian | G09F 21/048 |
| 2019/0205936 A1* | 7/2019 | Lal | H04W 4/12 |
| 2019/0385194 A1* | 12/2019 | Binkley | G06Q 30/0265 |
| 2021/0110426 A1* | 4/2021 | Hibbard | G06Q 30/0242 |

* cited by examiner

*Primary Examiner* — Meredith A Long
(74) *Attorney, Agent, or Firm* — Perkins Coie LLP

(57) ABSTRACT

Presented here is an apparatus and a method for measuring effectiveness of images displayed on a moving object. For example, the moving object can be a vehicle with a frame mounted on the rooftop. The frame can have one or more display screens mounted on one or more sides, showing various images. The vehicle can be a part of a fleet of vehicles in communication with each other. A camera can be mounted close to the display screen and can record images of the surrounding environment. An embedded system within the vehicle can analyze the recorded images to determine a total number of people having a line of sight to the displayed image, and a total number of people looking at the displayed image. Based on the analysis, the embedded system can determine the effectiveness of the displayed image.

20 Claims, 9 Drawing Sheets

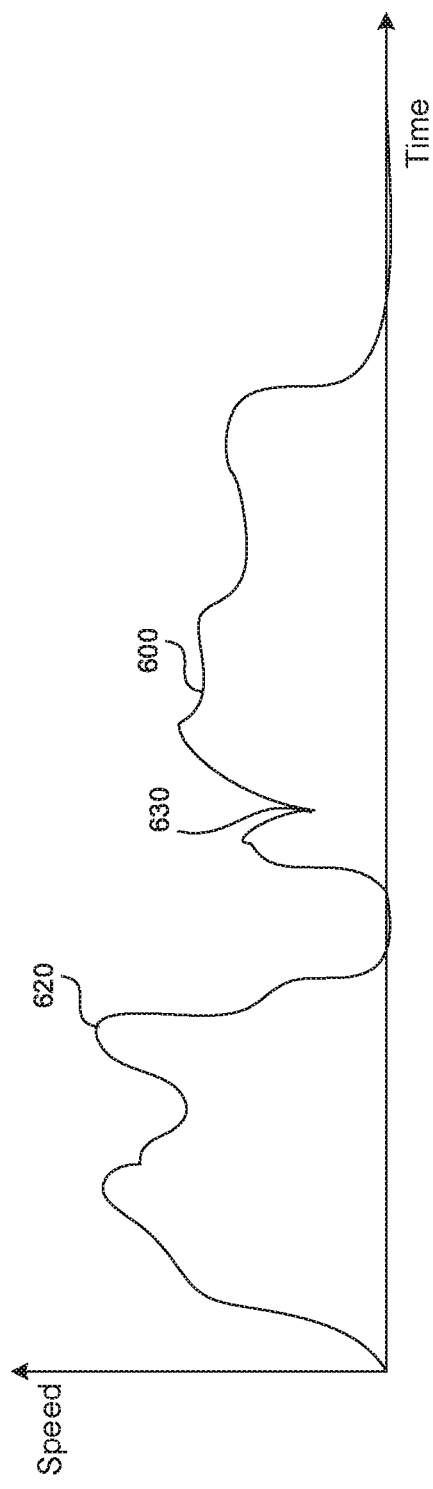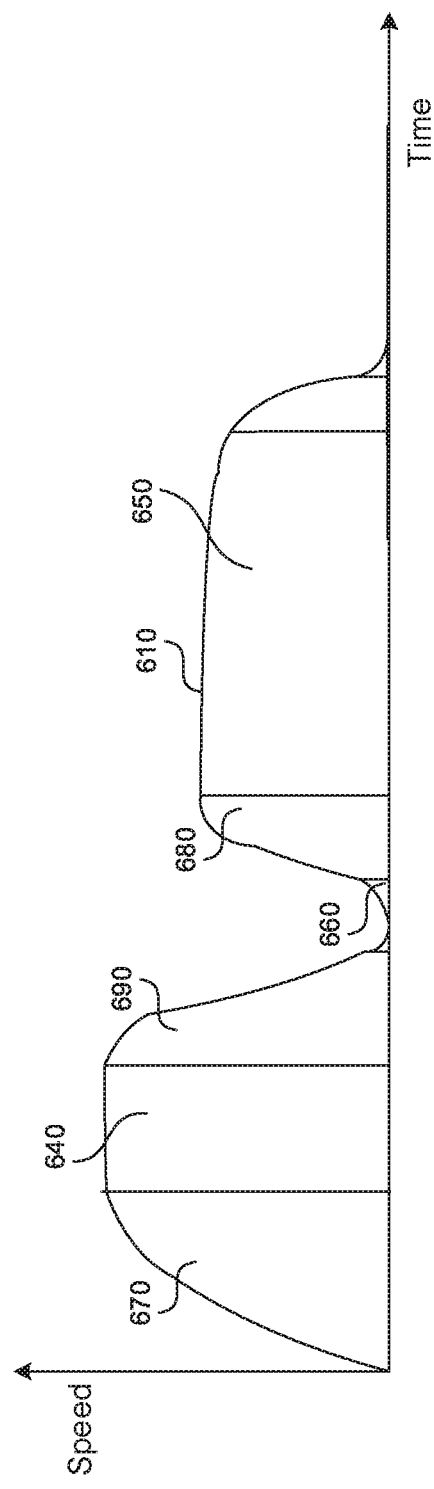

MEASURING EFFECTIVENESS OF IMAGES DISPLAYED ON A MOVING OBJECT

TECHNICAL FIELD

The present application is related to measuring effectiveness of images, and more specifically to methods and systems that measure effectiveness of images displayed on a moving object.

BACKGROUND

Currently measuring effectiveness of an image, such as an advertising image outside of a home is difficult. For example, advertisers cannot determine how many people have viewed an image displayed on a billboard. Moreover, if an advertiser has multiple images and/or advertising campaigns, the advertiser cannot determine which image or advertising campaign is most effective.

SUMMARY

Presented here is an apparatus and a method for measuring effectiveness of images displayed on a moving object. For example, the moving object can be a vehicle with a frame mounted on the rooftop. The frame can have one or more display screens mounted on one or more sides, showing various images. The vehicle can be a part of a fleet of vehicles in communication with each other. The display screens can display an image for approximately 8 seconds, and then switch to another image. A camera can be mounted close to the display screen and can record images of the surrounding environment. An embedded system within the vehicle can analyze the recorded images to determine a total number of people having a line of sight to the displayed image, and a total number of people looking at the displayed image. Based on the analysis, the embedded system can determine how effective the displayed image is.

Further, the embedded system can determine various attributes of the location and/or the viewers in the environment and can correlate an attribute to the effectiveness of the image. The attribute can include time of day, date, weather, event in a vicinity, income level of the neighborhood, average age of the neighborhood, languages spoken in the neighborhood, etc.

BRIEF DESCRIPTION OF THE DRAWINGS

FIGS. 6A-6B show how graphs of speed of the vehicle can be used in determining effectiveness of the image.

DETAILED DESCRIPTION

Presented here is an apparatus and a method for measuring effectiveness of images displayed on a moving object. For example, the moving object can be a vehicle with a frame mounted on the rooftop. The frame can have one or more display screens mounted on one or more sides, showing various images. The vehicle can be a part of a fleet of vehicles in communication with each other. The display screens can display an image for approximately 8 seconds, and then switch to another image. A camera can be mounted close to the display screen and can record images of the surrounding environment. An embedded system within the vehicle can analyze the recorded images to determine a total number of people having a line of sight to the displayed image, and a total number of people looking at the displayed image. Based on the analysis, the embedded system can determine how effective the displayed image is.

Further, the embedded system can determine various attributes of the location and/or the viewers in the environment and can correlate an attribute to the effectiveness of the image. The attribute can include time of day, date, weather, event in a vicinity, income level of the neighborhood, average age of the neighborhood, languages spoken in the neighborhood, etc.

The various functions performed by the embedded system, as described in this application, can also be performed by a remote computing system, such as a cloud computer. The embedded system can transfer the images and/or videos using a high-speed wireless network, such as a 5G network, to communicate with the remote computing system. The remote computing system can perform the various analysis described in this application, and return the results to the embedded system. The returned results can include advertisements as well as instructions on when and where to display advertisements that are available to the embedded system.

Measuring Effectiveness of Images Displayed on a Moving Object

Figure 1:
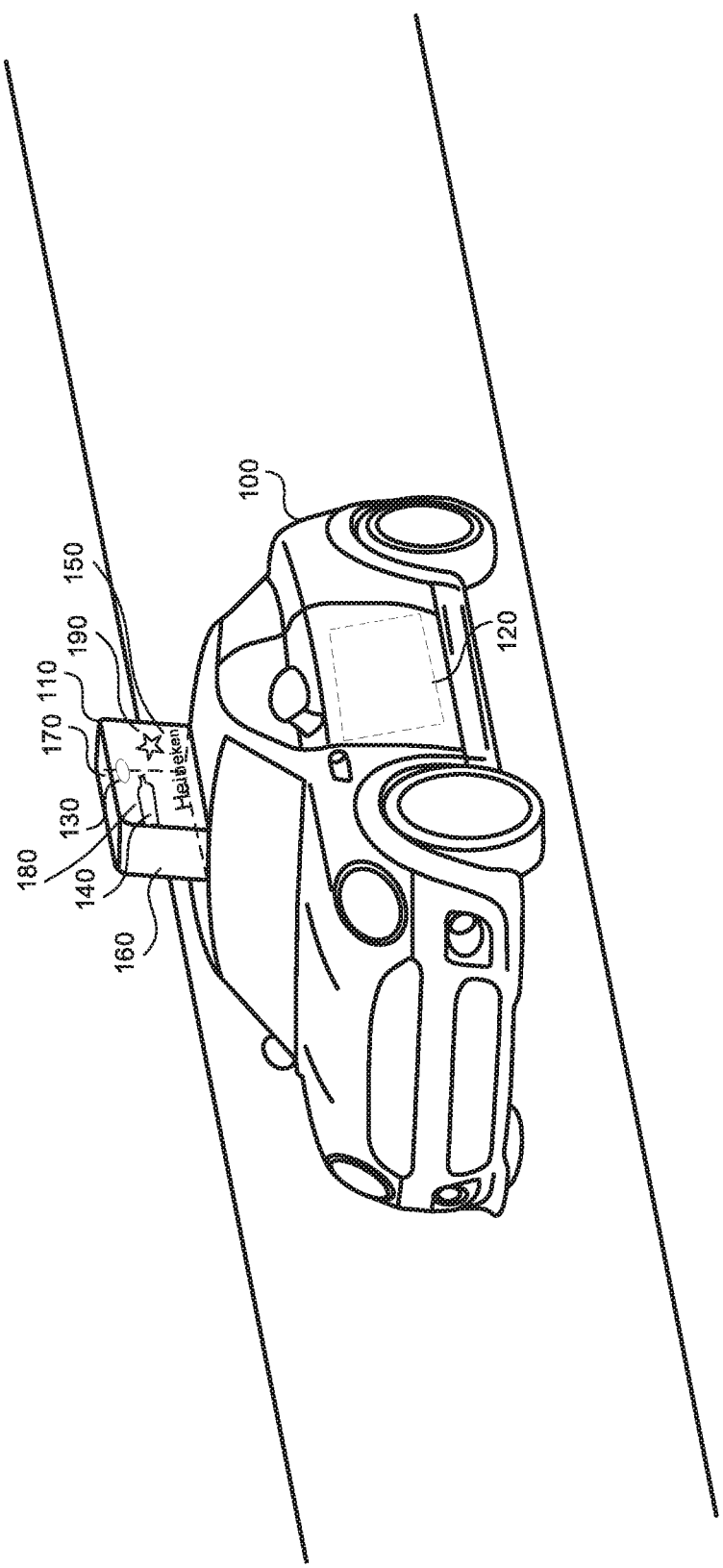
FIG. 1 shows a moving object with a display member.

FIG. 1 shows a moving object with a display member. The moving object 100 can be a vehicle having a dual purpose including transportation of goods and/or people, and carrying the display member 110. The vehicle can include a car, a motorcycle, a bicycle, a scooter, a helicopter, a drone, or any other mobile device having a dual purpose. The moving object 100 can also have a sole purpose to support to the display member 110, such as a drone, a blimp, a mobile platform, a robot, etc. The moving object 100 can be part of a fleet of moving objects, such as a fleet of vehicles, that can communicate with each other. The communication can be done member to member or can be done via Wi-Fi or a cellular network.

The display member 110 can be secured to the moving object 100, for example on top of the moving object 100, as shown in FIG. 1. The display member 110 can also be secured on a side of the moving object, in position 120, on the bottom of the moving object, etc. The display member 110 can display a number of different images and/or videos 140. The images and/or videos 140 can be advertisements. The length of the display can vary between 5 seconds to 30 seconds.

The display member 110 can have multiple screens 150, 160, 170, 180, 190. Each display screen 150, 160, 170, 180, 190 can show a different part of a single image, and/or can show independent images. The screens 150, 160, 170, 180, 190 can contain various light emitting elements such as light emitting diodes (LEDs), liquid crystal display (LCDs), and/or organic light emitting diodes (OLED), etc.

An imaging device 130 can be secured to the moving object 100. The imaging device can be proximate to the display member, or can be co-located with the display member 110, as shown in FIG. 1, to enable the imaging device 130 to record the environment surrounding the display member 110. The imaging device 130 can be associated with each screen 150, 160, 170, 180, 190 of the display member 110. The imaging device 130 can be integrated into the display member 110, by for example being placed beneath the display screen 110. The imaging device 130 can be a camera capable of recording an image, a video, a point cloud, etc. of the surrounding environment. The imaging device 130 can be sensitive to visible light, infrared light, ultraviolet light, etc. The imaging device 130 can record images in the dark for example using an infrared sensor. The imaging device 130 can record one or more images per second, for example two images per second.

Figure 2A:
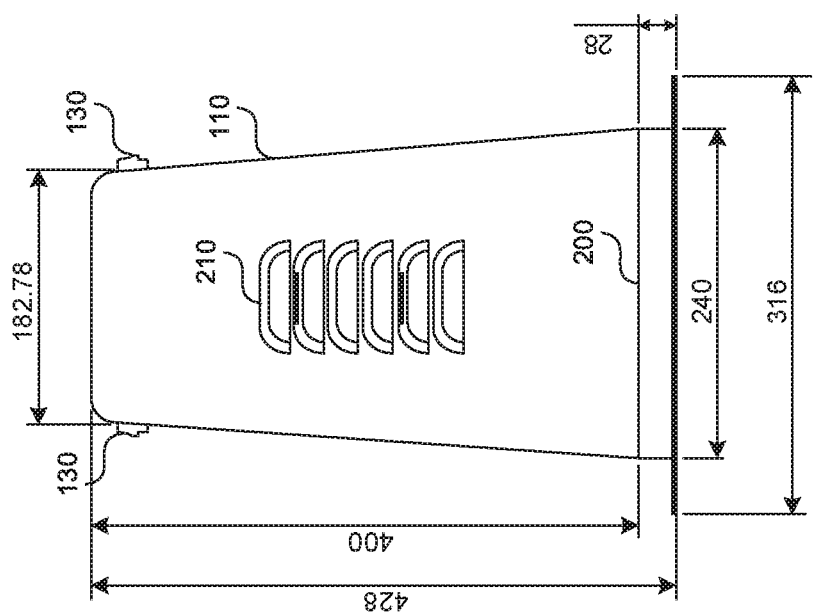
FIG. 2A shows a side view of the display member.

FIG. 2A shows a side view of the display member 110. FIG. 2A shows measurements of the display member 110 in centimeters. The display member 110 can have a secured imaging device 130. The imaging device 130 can be flush with a surface of the display member 110, or can protrude from the surface of the display member 110, as shown in FIG. 2A.

The display member 110 can be shaped like a trapezoid and/or a trapezoid with rounded corners, where a wide base 200 of the trapezoid is secured to the vehicle to ensure stability of the display member 110. The display member 110 can contain vents 210 that provide cooling to the interior of display member 110. The exterior surface of the vents can be sloped downward to prevent dirt and water from getting into the interior of the display member 110. The display member 110 can be shaped like a prism with or without rounded corners. The prism can be regular or irregular. For example, the prism can be a triangle prism, a rectangular prism, a pentagonal prism, etc.

Figure 2B:
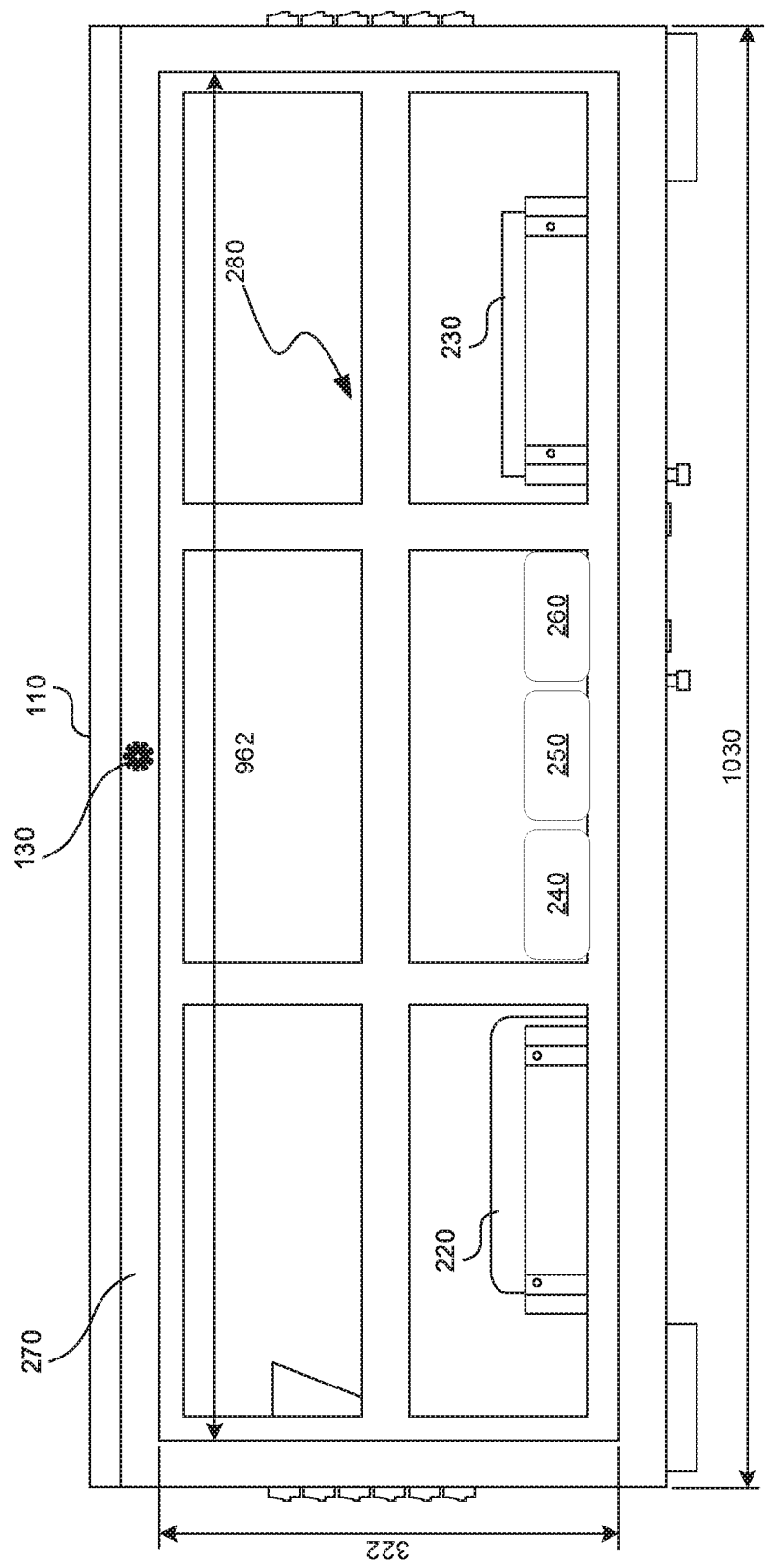
FIG. 2B shows internal components of the display member.

FIG. 2B shows internal components of the display member 110. FIG. 2B also shows measurements of the display member 110 in centimeters. The display member 110 can include an embedded system 280 which in turn can include one or more processors 220, one or more locators 230, two or more imaging devices 130, one or more neural compute sticks 240 such as Intel Movidius, one or more cellular dongles 250, and a memory 260.

The one or more processors 220 can be a part of a Raspberry Pi. The one or more processors 220 can execute the instructions and can control the screens 150, 160, 170, 180, 190 of the display member 110, and other internal components 230, 130, 240, 250, 260.

The one or more locators 230 can measure the vehicle's latitude and/or longitude when the vehicle is stationary or while the vehicle is moving. The one or more locators 230 can be any combination of a GPS dongle, a cellular transceiver, a Wi-Fi transceiver, a mesh network transceiver, etc. For example, when the locator 230 is a cellular transceiver, the location of the vehicle can be determined by triangulating the location of the vehicle from the nearby cell towers. Similarly, when the locator 230 is a Wi-Fi transceiver the location of the vehicle can be determined by Wi-Fi positioning system (WPS) or WiPS/WFPS which uses the characteristics of nearby Wi-Fi hotspots and other wireless access points to discover where a device is located.

The two or more imaging devices 130 can record images, including videos, of the surrounding pedestrians. The two or more imaging devices 130 can be mounted on a frame 270 supporting the display screens 150, 160, 170, 180, 190 in FIG. 1.

The neural compute stick 240 can speed up the analysis of images taken by imaging devices 130. The neural compute stick 240 can enable the embedded system 280 of the display member 110 to perform real time image processing to track surrounding people and their gaze, to determine whether a person is looking at the display member 110. The embedded system 280 including components 230, 130, 240, 250, 260 can perform the image analysis and determine direction of a person's gaze, even when the embedded system 280 is off-line.

The neural compute stick 240 can support execution of an artificial intelligence (AI), such as a neural network, that is trained for identifying people and the direction of their gaze, in conditions where there is a high amount of motion, where the motion is jerky, when there is varying lighting, etc. Further, the data recorded by the imaging device 130 can be used in further training the AI to more accurately identify the people and the direction of their gaze.

The cellular dongle 250 can send and receive data from a remote computer such as a server. For example, the cellular dongle 250 can send the recorded images to the server for storage, can send the results of the analysis to the server, or can receive analysis results from the server.

The memory 260 can be a USB stick. The memory 260 can store images, and can upload them to the server, when the embedded system 280 comes online.

Figure 3:
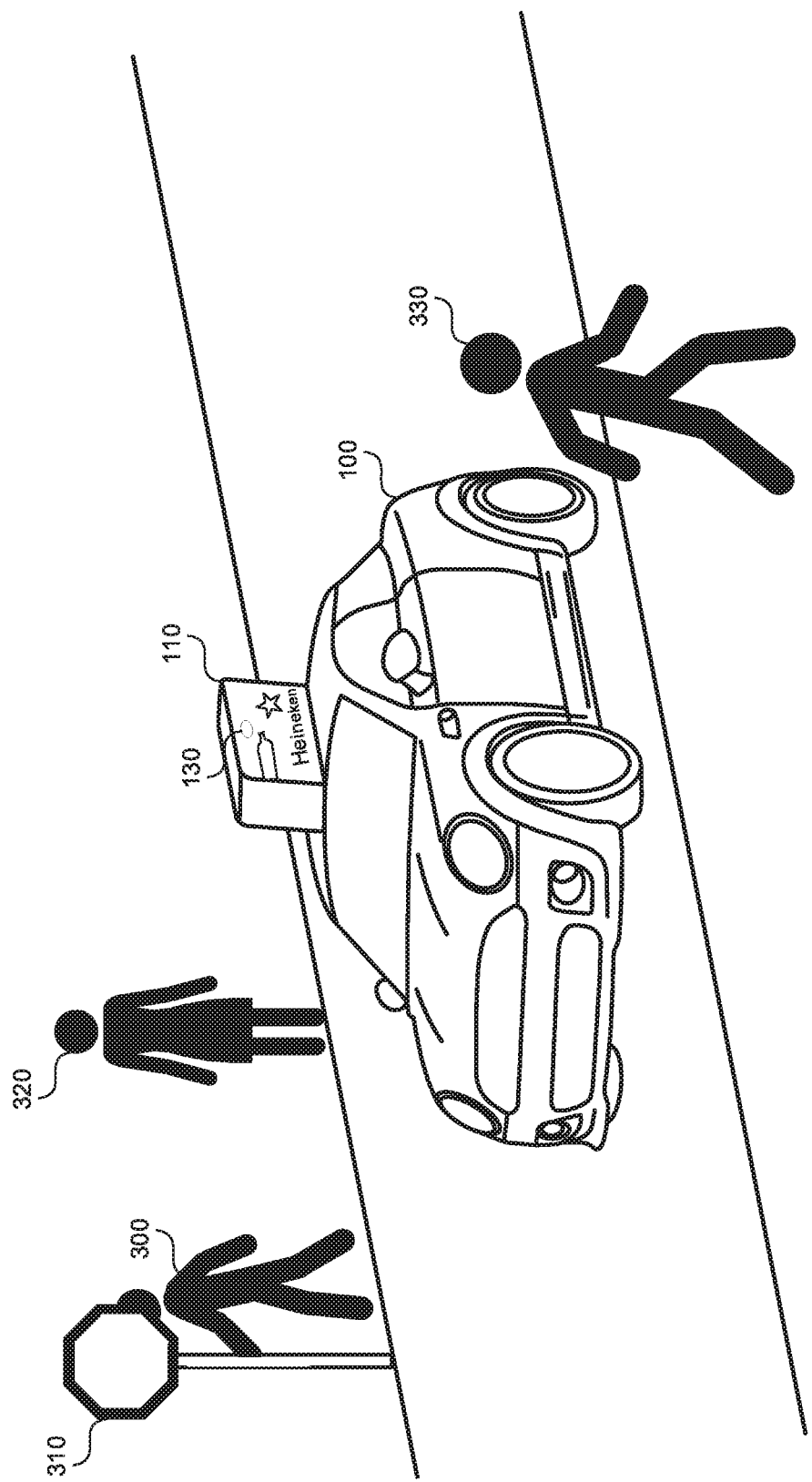
FIG. 3 shows an environment surrounding a vehicle.

FIG. 3 shows an environment surrounding a vehicle 100. The imaging devices 130 can make a recording on both sides of the street. The recording can be an image, such as a still image or video, a point cloud, lidar data, radar data, etc. The embedded system 280 in FIG. 2B can analyze a recording made by the imaging devices 130 to determine a total number of people having a line of sight access to the display member 110 and a portion of the total number of people having the line of sight access to the display member 110 who are looking at the display member 110.

For example, the embedded system 280 can determine that person 300 does not have a line of access to the display member 110, because person's 300 head is occluded by the stop sign 310. The embedded system 280 can determine that the total number of people having the line of sight access to the display member 110 is two, and includes person 320, 330. To make the determination of the total number of people having the line of sight access, the embedded system 280 can speed the computation by determining whether a person's head is occluded, without having to identify a person's eyes in the direction of the person's gaze.

Once the embedded system 280 determines that people's 320, 330 are not included, the embedded system 280 can determine the direction of the people's 320, 330 gaze. The embedded system 280 can determine the direction of the people's gaze by identifying, for example, whether the two eyes are visible in the recording. In another example, the embedded system 280 can determine the direction of people's gaze, by identifying a location of the pupils within a person's eyes. The embedded system 280 can determine that person 320 is looking at the display member 110, while person 330 is not looking at display member 110. Consequently, the embedded system 280 can determine that the portion of the total number of people having the line of sight access for looking at the display member is 50%.

The embedded system 280 can determine the effectiveness of the recording based on the total number of people having the line of sight access to the display member 110 and the portion of the total number of people looking at the display member 110. For example, the embedded system 280 can determine when the person is looking at the display member to determine the effectiveness of the image.

The effectiveness of the image can be determined by comparing the percentage of viewers, for example, 50% in the above example, to a predetermined threshold such as 20% if the percentage of viewers is higher than the predetermined threshold, then the image is deemed as effective. Additionally, the various images displayed can be ranked according to their own percentage of viewers, so that, for example, an image with the percentage of viewers equal to 70% is ranked above an image with the percentage of viewers at 50%. A certain portion of the image so ranked can be deemed to be effective. For example, the top 80% of the ranked image can be deemed to be effective.

The embedded system 280 can receive multiple consecutive recordings of the environment surrounding the display member, such as multiple consecutive images. The embedded system 280 can track a person in the consecutive recordings by, for example, using an AI that is trained for identifying people in conditions where there is a high amount of motion, jerky motion, varying lighting, etc.

The challenge presented by mounting the imaging device 130 on a moving object 100 where there is a high amount of motion and possibly jerky motion is that there is little or no motion coherence between consecutive recordings. Consequently, doing a motion prediction of a person from frame to frame is of little value, because a person can jump from a lower right corner to upper middle side of a recording, between two consecutive recordings, due to a downward motion of the vehicle, such as when the vehicle hits a pothole in the road. Further, due to changing lighting conditions such as a person going in and out of the building shadow, using brightness is of little value in tracking a person. As a result, the embedded system 280 can utilize color associated with the person such as clothing color, hair color, skin tone, and to a lesser extent, motion coherence and brightness to identify a person in consecutive frames. An artificial intelligence model trained to take into account these factors in the context of low motion coherence and varying lighting can be used to identify a person from frame to frame.

The embedded system 280 can count as a single impression the person continually looking at the image displayed on the display member 110 in a portion of the consecutive images. In one embodiment, when the person looks at the image, then looks away, and then looks back at the image, embedded system 280 can count that as separate impressions when calculating the effectiveness of the image.

In another embodiment, the embedded system 280 can determine that the same person has looked twice at the image and can count the separate glances of the image as a single impression. Further, the embedded system 280 can determine that the person who has looked multiple times at the image is interested in the image. The system can record attributes of the person looking multiple times to the image and record that the image is effective with people tending to have those attributes. For example, the attributes can be the location where the person looked at the image multiple times, events nearby, time of day, date, weather, age of the person, gender of the person, race of the person, income level of the location, etc. Events can be sporting events, concerts, gallery openings, etc.

The attributes of the person interested in the image can be used to predict that the image would be effective in a neighborhood having similar attributes as the person interested in the image. For example, if the vehicle 100 is in a new neighborhood, the attributes of the neighborhood can be received from the Internet, such as the demographic of the residents of the neighborhood (such as average age, racial makeup, average income in the neighborhood, languages spoken), time of day, date, weather, events nearby, etc. When the attributes of the neighborhood match the attributes of the person interested in the image, the embedded system 280 can display the image. The attributes of the neighborhood and the person do not have to perfectly match, but can have, for example, a 70% or above match.

The data gathered by a single vehicle 100 can be shared with multiple vehicles carrying an instance of the embedded system 280. The data gathered by the single vehicle 100 can be uploaded to a central server, from where the data can be shared with other vehicles in the fleet.

The embedded system 280 can obtain, based on the location of the moving object, an attribute including a time of day, date, weather, an event in a vicinity, or a demographic associated with the location of the moving object. The embedded system 280 can correlate the attribute to the effectiveness of the image. For example, the embedded system 280 can correlate the effectiveness of the image to the time of day, day, weather, the event in a vicinity, the demographic, etc. After gathering the data under varying attributes by a fleet of vehicles, the embedded system 280 can determine which attribute has a high correlation with the effectiveness of the image.

For example, the data gathered by the fleet of vehicles can indicate that in a wealthy neighborhood, where a median income is $300,000-$400,000, images of luxury brands, and not value brands tend to have higher effectiveness. In another example, the data gathered by the fleet of vehicles can indicate that in an artistic neighborhood, artistic images have a higher effectiveness.

Figure 4:
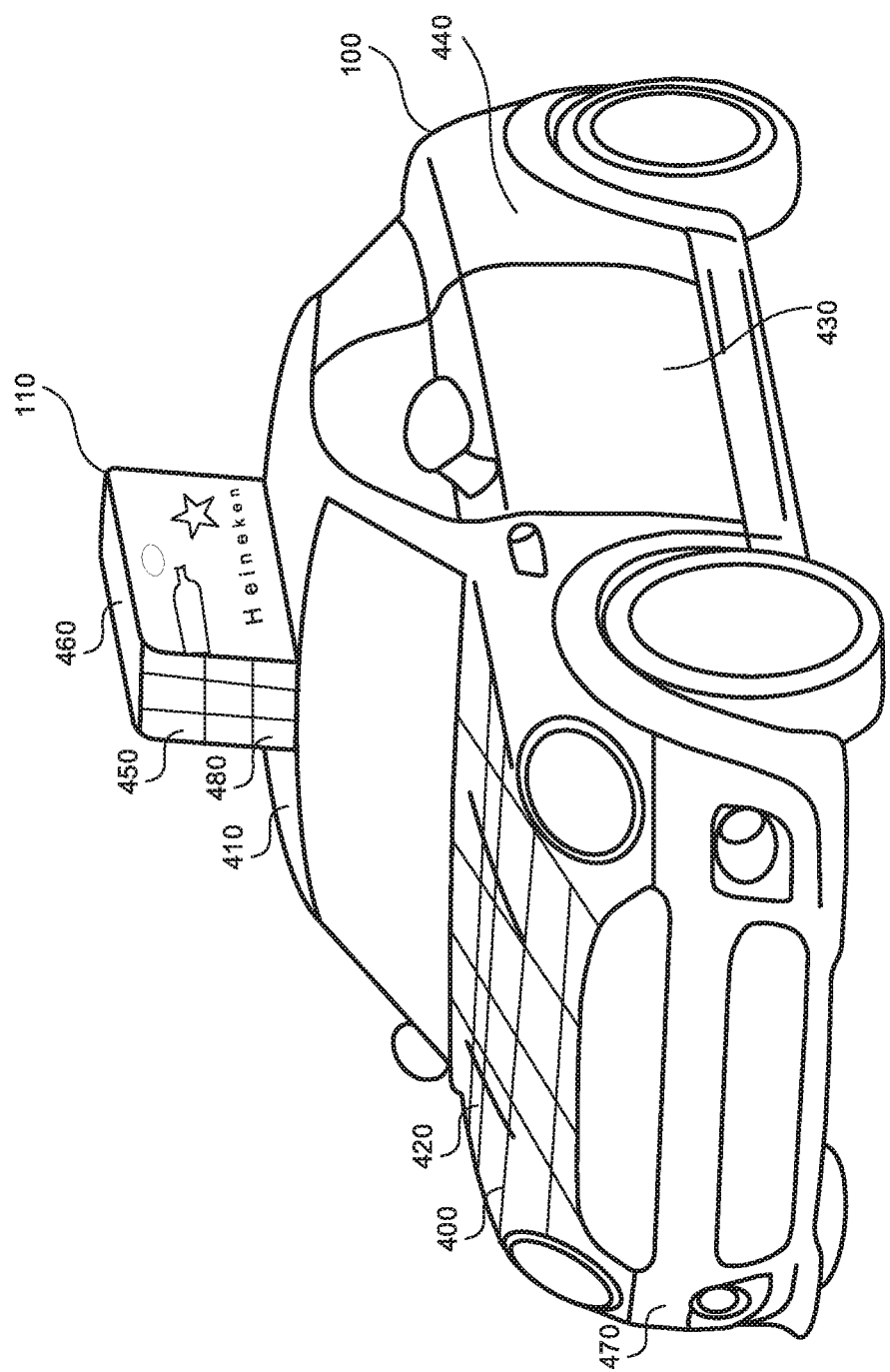
FIG. 4 shows various sources of power for the display member.

FIG. 4 shows various sources of power for the display member 110. The display member 110, as well as the embedded system 280 in FIG. 2B can be powered by a power source contained in the moving object 100, such as a vehicle battery. Instead of, or in addition to the vehicle battery, other sources of power can be installed on the vehicle.

For example, various surfaces 400, 410, 430, 440 (only four labeled for brevity) of the moving object 100 and/or various surfaces 450, 460 (only two labeled for brevity) of the display member 110 can contain solar cells 420 (only one labeled for brevity) that can power the display member 110 and the embedded system 280.

In another example, surfaces that tend to be perpendicular to a direction of motion of the vehicle can have piezoelectric materials installed to generate power from the wind pressure generated by the motion of the vehicle. For example, surface 470 of the moving object 100 and surface 450 of the display member 110 can have piezoelectric materials 480 (only one labeled for brevity) installed to generate power from the vehicle motion.

Figure 5:
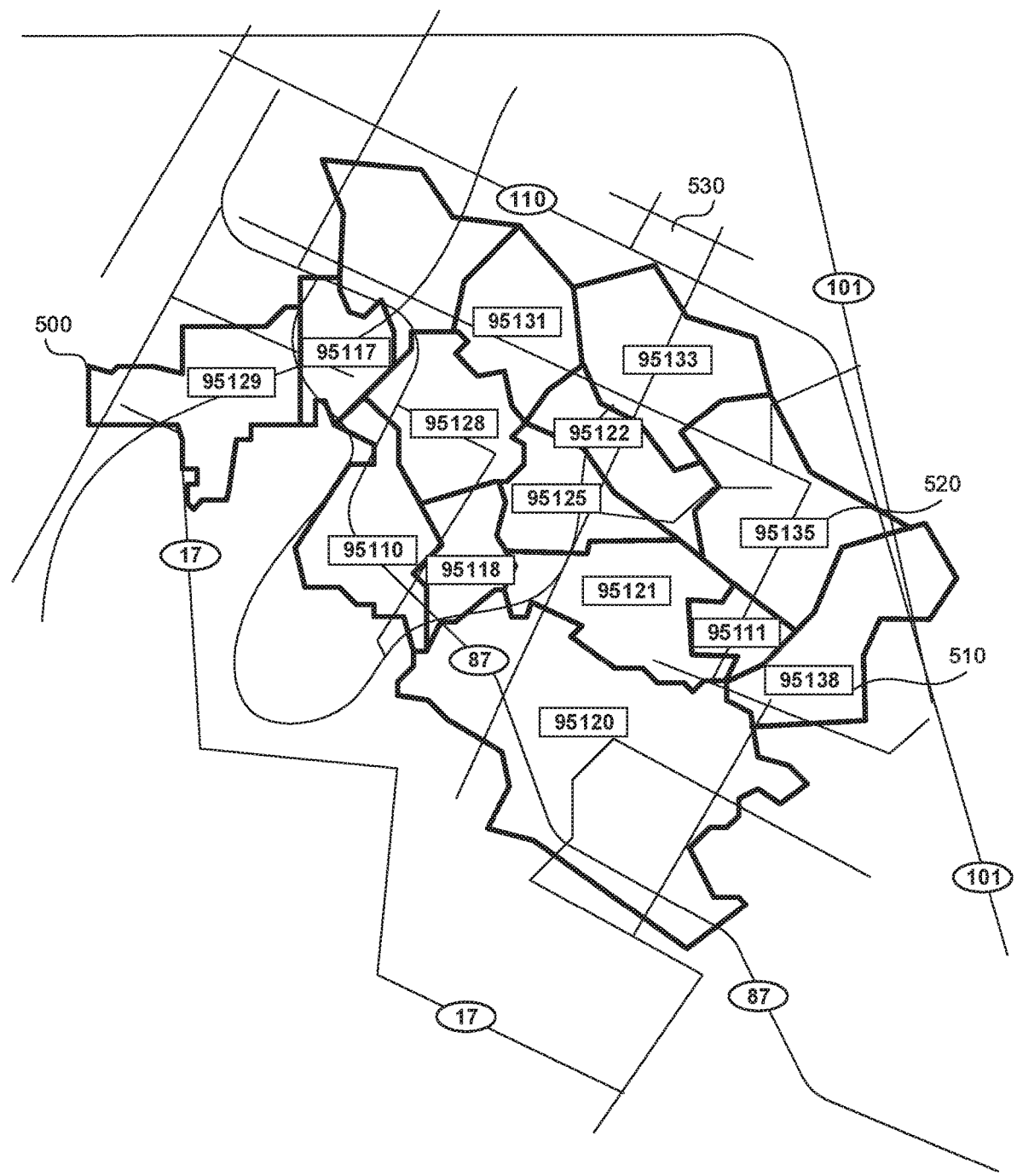
FIG. 5 shows various ways in which a neighborhood can be defined.

FIG. 5 shows various ways in which a neighborhood can be defined. Attributes to correlate to the effectiveness of the image can be collected at an individual level, as described in this application, and/or at the neighborhood level. The neighborhood can be defined as a city 500, a ZIP Code within the city 510, 520 (only two labeled for brevity), a block 530, etc.

The embedded system 280 in FIG. 2B can associate attributes of the neighborhood 500, 510, 520, 530 with effectiveness of the image. When the moving object 100 in FIG. 1 is in a neighborhood, the embedded system 280 can determine one or more attributes of the neighborhood and play the most effective images. For example, luxury brands can be advertised in a neighborhood that has an attribute of high income, while value brands can be advertised in a neighborhood that has an attribute of low income. In another example, when the moving object 100 is in a neighborhood with an aging population, images relevant to the aging population can be advertised such as senior care services, legal services for the elderly such as wills and trusts, memory assistance services, etc.

Embedded system 280 can associate multiple attributes throughout the day, such as different neighborhoods, different times, weather, etc. with a specific image and measure engagement based on the number of pedestrians and how many of them are engaged. Based on the data, the embedded system 280 can determine that two or three images do the best in early morning, sunny weather, in a particular neighborhood, etc. On a higher level, embedded system 280 can rank various images based on the number of views the images have received. Based on the data, embedded system 280 can change the frequency of the images being displayed.

For example, when the moving object 100 is in a new neighborhood, when novel data regarding effectiveness of the images comes in, or when effectiveness of the images has been adjusted, the embedded system 280 can determine attributes of the neighborhood where the embedded system is, and can display the most effective images.

The embedded system 280 can obtain, based on a current location of the moving object, multiple attributes including a time of day, weather, date, an event in a vicinity, or a demographic associated with the location of the moving object, etc. The embedded system 280 can determine a second location having a second set of multiple attributes similar to the plurality of attributes. Similar attributes can be determined according to various criteria. For example, if 60% or more of the attributes are the same, the two locations can be considered to have similar attributes. In another example, the attributes can be ranked from most important to least important to determine similarity, such as an event in a vicinity can be ranked to have a high importance, followed by the demographic. When one or more of the high-ranking attributes are between two locations, the two locations can be considered to have similar attributes. The embedded system 280 can display the image that has been determined to be effective at the second location at the current location.

To determine the effectiveness of the image with varying attributes, the embedded system 280 can change the attributes to determine which attribute increases or decreases the effectiveness of the image. For example, if an image is not effective on a particular day in a particular neighborhood in particular weather, given a particular event, the embedded system 280 can display the image on a different day having different weather and a different event. Embedded system 280 can also change the neighborhood, etc. The attributes can be changed one at a time to individually determine the effectiveness of the image. If no attribute change increases the effectiveness of the image, embedded system 280 can decide to stop playing the image.

The embedded system can obtain, based on the location of the moving object, multiple attributes including a time of day, date, weather, an event in a vicinity, or a demographic associated with the location of the moving object. Upon determining that the image is not effective, the embedded system 280 can vary an attribute until the image is effective or all attributes have been varied. When all attributes have been varied and the image is not effective, the embedded system 280 can remove the image from the display member.

FIGS. 6A-6B show how graphs of speed of the vehicle can be used in determining effectiveness of the image. FIG. 6A shows a graph 600 of a vehicle speed over time. FIG. 6B shows a graph 610 of the vehicle speed over time in which the vehicle speed 600 has been passed through a low-pass filter. The high frequency peaks and valleys such as 620, 630 (only 2 labeled for brevity) in graph 600 have been removed in graph 610.

The embedded system 280 in FIG. 2B can obtain a speed of the vehicle. Graph 600 can represent the speed of the vehicle. Embedded system 280 can perform a low pass filter of the speed of the vehicle represented over a period of time. Graph 610 can represent the speed of the vehicle after low-pass filtering.

Embedded system 280 can segment the time into multiple periods 640, 650, 660 (only 3 labeled for brevity), so that the speed of a vehicle in a period 640, 650, 660 is within a consistent range, such as within a 10 mph range. Further, the embedded system 280 can segment the time into multiple periods 670, 680, 690 (only 3 labeled for brevity), during which the acceleration is within a constant range such as 10 mph/hr. or −15 mph/hr.

The embedded system 280 can determine the period among periods 640, 650, 660, 670, 680, 690 during which the displayed advertisement was effective. The embedded system 280 can make recommendations to the vehicle about a desired speed and/or acceleration to make an image currently displayed more effective.

The embedded system 280 can obtain a speed of the moving object when a person is looking at the display member. Embedded system 280 can inversely correlate the speed of the moving object to the effectiveness of the image. For example, if a car is driving above a predetermined threshold, such as 60 mph, the number of people viewing the image is likely lower due to the fast speed of the car as compared to when the car is driving below the predetermined threshold. As a result, the effectiveness of the image can be increased to account for the fast speed of the car.

Figure 7:
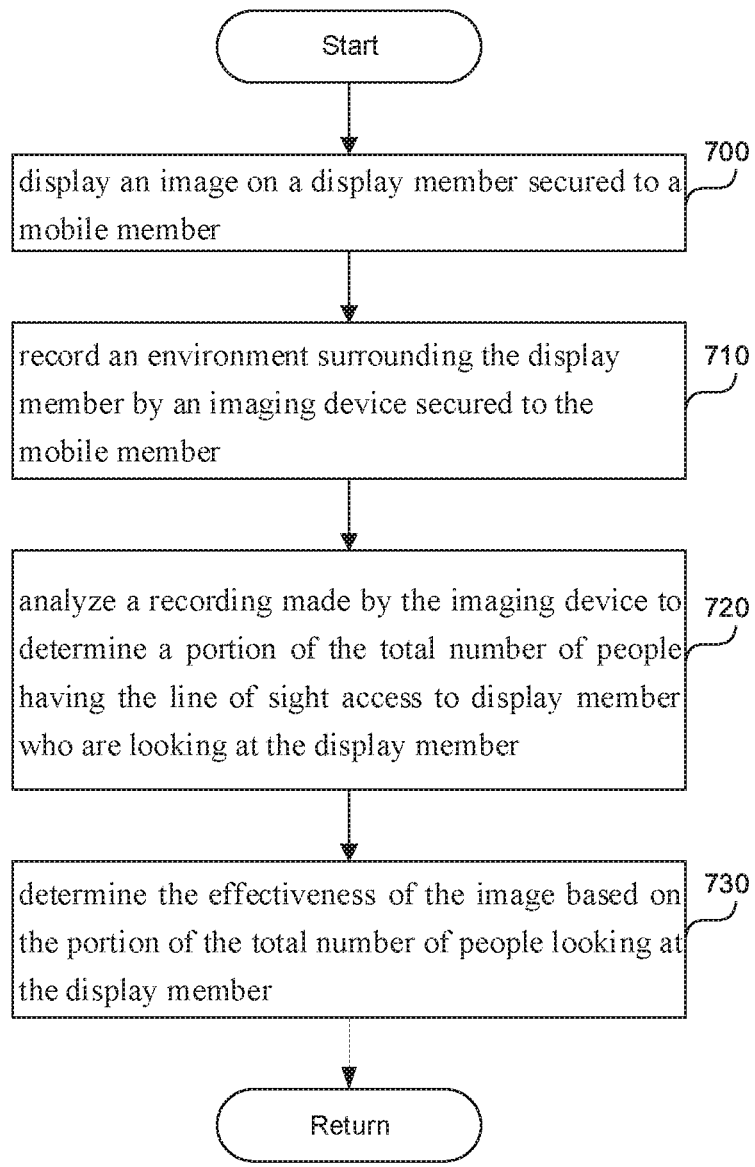
FIG. 7 is a flowchart of a method to determine effectiveness of an image displayed on a mobile platform.

FIG. 7 is a flowchart of a method to determine effectiveness of an image displayed on a mobile platform. In step 700, a processor can display an image on a display member secured to a moving object. The image can be displayed for a predetermined period of time such as 8 seconds. The moving object can be a vehicle such as a car, a drone, a truck, a bus, or a movable object such as a mobile platform, a robot, a blimp, etc. The processor can be a part of the embedded system and/or a part of a remote computing system, such as a cloud computing system.

In step 710, the processor can record an environment surrounding the display member by an imaging device, such as a camera, secured to the moving object. The imaging device can be placed in proximity to the display member. For example, the imaging device can be built into the display screen or attached to a display screen. There can be multiple imaging devices attached to the display member. For example, the imaging device can be associated with each screen of the display member. The imaging device can take multiple pictures each second, such as two pictures every second.

In step 720, the processor can analyze a recording made by the imaging device to determine the total number of people having a line of sight access to the display member and a portion of the total number of people having the line of sight access to the display member who are looking at the display member. The recording can be an image, a video, a point cloud, etc.

In step 730, the processor can determine the effectiveness of the recording based on the total number of people having the line of sight access to the display member and the portion of the total number of people looking at the display member. The processor can rank the recordings made in one neighborhood. The images that are in the top half of the rankings can be considered to be effective. Also, the images that have percentage of viewers above a certain threshold can be considered to be effective, such as images that have 70% or more of the people in the environment looking at them.

The processor performing the operations can be part of the embedded system 280 in FIG. 2B and/or can be part of a remote computing system, such as a cloud computing system. The processor can perform all the operations locally, within the embedded system 280, without requesting processing power from a remote processor, such as a cloud server. For example, when the vehicle is in an area where there is no cellular network, or the cellular network is intermittent, the effectiveness of the displayed images can still be measured.

The processor can perform image analysis when the processor is off-line. The processor can record multiple images of the environment. The processor can track a person in the images to determine the gaze direction of the person when the moving object is off-line. For example, the processor can utilize a neural compute stick 240 in FIG. 2B to perform the tracking operation. When the gaze direction of the person points in a direction of the display member, the processor can count the person as a member of the portion of the total number of people having the line of sight access to the display member who are looking at the display member.

To determine the gaze direction of the person from the recorded image, the processor can utilize AI such as a machine learning model. The processor can receive multiple consecutive images of the environment surrounding the display member. The processor can train the AI to identify a person and a direction of a person's gaze in the consecutive images having a low amount of motion coherence and under varying lighting conditions. As explained in this application, utilizing motion coherence and luminance to locate the person from frame to frame is challenging when the imaging device is mounted on a vehicle. Consequently, a specially trained AI may be needed to perform the tracking.

For example, analysis of the recorded images of the environment can be performed independently of the AI, to determine whether the AI has correctly identified that a person is looking at the display member, that the person is looking away from the display member, or that a person's view is obstructed. The recorded images of the environment, where a person was incorrectly classified by the AI, can be used as a part of a training set to retrain the AI, or to train a new AI.

The processor can determine when a person repeatedly looks at the image shown on the display member, and can estimate a demographic of the person based on a location of the person, an appearance of the person, a time of day, weather, an event in a vicinity, etc. For example, if there is a San Francisco Giants game going on nearby, and the person is wearing a San Francisco Giants baseball hat, the processor can estimate the demographic of the person by determining that the person is a San Francisco Giants fan. The processor can record an indication that the image is effective with the estimated demographic. When the same vehicle, or another vehicle in the fleet is in a neighborhood having a similar demographic as the person who repeatedly looked at the billboard, the processor can display the image again. For example, if the vehicle is in a neighborhood close to the San Francisco Giants home stadium, the image that was effective with the San Francisco Giants fans can be displayed again.

The processor can count as a single impression the person continually looking at the display member in a portion of the consecutive images. If a person is looking at the billboard for a prolonged amount of time, for example for more than two seconds, the processor can record that the image is effective with the demographic of the person looking at the billboard. When a person is repeatedly looking at the billboard, the processor can count a second look as a single impression, or a second impression.

The processor can determine how the effectiveness of the image varies with the various attributes. The processor can determine a location of the vehicle, using a location tracker such as a GPS, a cellular transceiver, a Wi-Fi transceiver, etc. The processor can obtain, based on the location of the vehicle, a plurality of attributes including a time of day, weather, an event in a vicinity, or a demographic associated with the location of the moving object. The demographic can include age group, income level, home location, languages spoken, gender, race, etc. The processor can obtain attributes of the location from the Internet. The processor can vary the attributes, such as time of day, weather event in a vicinity, or the neighborhood, to determine how the effectiveness of the image varies with the attributes. Consequently, the processor can correlate the attribute to the effectiveness of the image.

When the vehicle is in a new neighborhood, the processor can determine the attribute of the new neighborhood and play images that are positively correlated with the attribute of the new neighborhood. For example, the processor can identify an image that generally is effective with various audiences and can play the image in the new neighborhood. In another example, the processor can identify the attribute of the neighborhood as having a high demographic of people speaking Spanish. Consequently, the processor can display images in Spanish, and/or images identified as being effective with Spanish-speaking audiences.

The processor can determine a current location of the moving object. The processor can obtain, based on a current location of the moving object, multiple attributes including a time of day, weather, an event in a vicinity, or a demographic associated with the location of the moving object. The processor can determine a second location having a second plurality of attributes similar to the plurality of attributes, such as same event in a vicinity, similar demographic, similar time of day. As explained in this application, attributes can be prioritized from the most important to the least important to determine similarity. The processor can obtain an image that has been determined to be effective at the second location, and the processor can display the image that has been determined to be effective at the second location at the current location.

If the image is not effective on a particular day in a particular neighborhood in particular weather, given a particular event, the processor can vary the attributes to determine which attribute increases the effectiveness of the image. If no attribute increases the effectiveness of the ad, the processor can stop displaying the image. For example, the processor can obtain based on the location of the moving object, multiple attributes including a time of day, weather, an event in a vicinity, or a demographic associated with the location of the moving object. Upon determining that the image is not effective, the processor can vary an attribute until the image is effective or all of the attributes have been varied. The processor can vary one attribute at a time and/or multiple parameters at a time. When all the attributes have been varied and the image is not effective, the processor can stop displaying the image on the display member.

Computer

Figure 8:
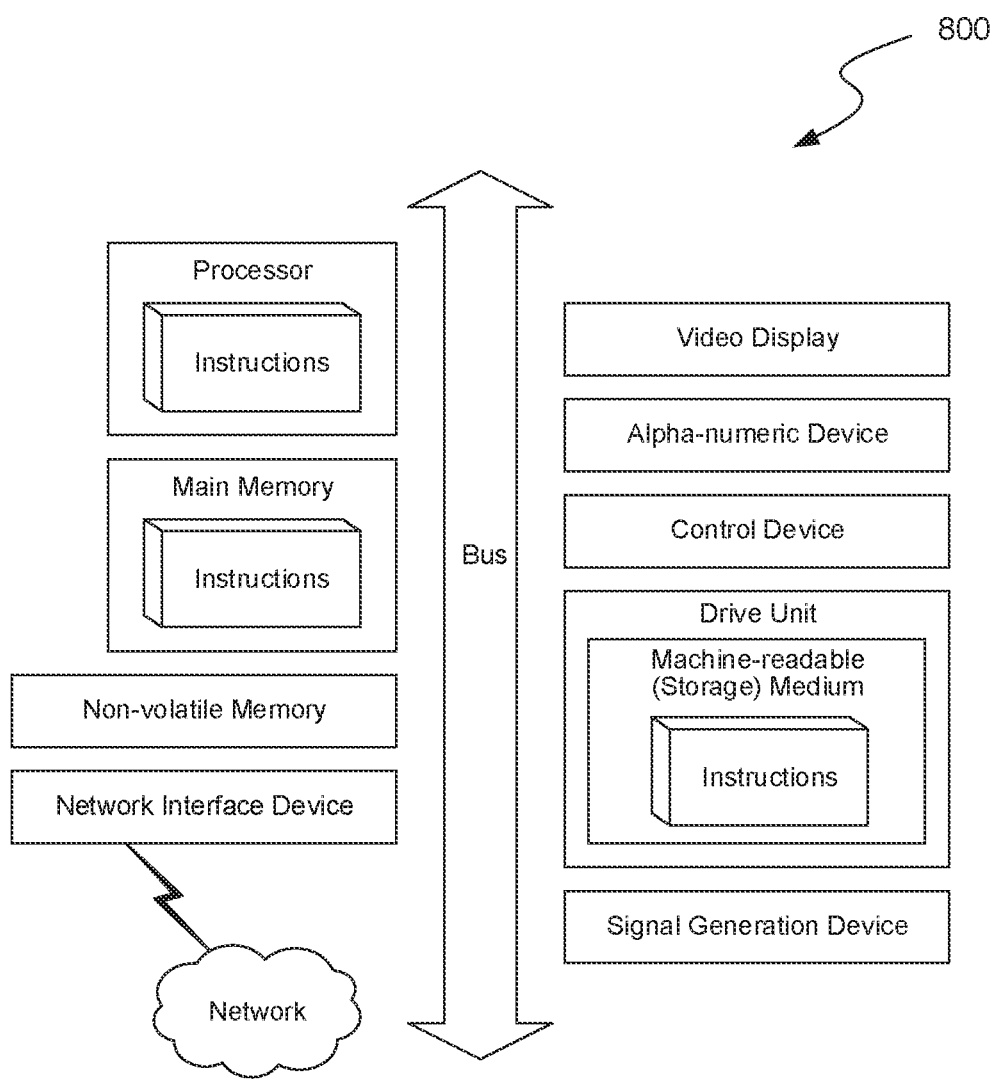
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

The computer system 800 can be a part of the embedded system 280 in FIG. 2B, or can be part of a remote computing system, such as a cloud computing system. The main memory, non-volatile memory and/or the drive unit can store images to be displayed, recordings made by the imaging device 130 in FIG. 1, determinations of which images are effective in how the images correlate to various attributes. The video display can be the display member 110 in FIG. 1. The network interface device can be a cellular transceiver, a Wi-Fi transceiver, a mesh network transceiver of the embedded system 280, etc.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., compact disk read-only memory (CD-ROMS), digital versatile disks, (DVDs), etc.), among others, and transmission type media such as digital and analog communication links.

In some circumstances, operation of a memory device, such as a change in state from a binary one to a binary zero or vice versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list in which a change in state from a binary one to a binary zero or vice versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
a vehicle to measure an effectiveness of an out of home advertisement, the vehicle comprising:
a display member secured to the vehicle and configured to display an advertisement;
a camera secured to the vehicle and disposed proximate to the display member, the camera to record an environment surrounding the display member; and
one or more processors configured to:
analyze an image recorded by the camera to determine a total number of people having a line of sight access to the display member and a portion of the total number of people having the line of sight access to the display member who are looking at the display member; and
determine the effectiveness of the out of home advertisement based on the total number of people having the line of sight access to the display member and the portion of the total number of people looking at the display member.

2. The system of claim 1, comprising:
a locator to determine a location of the vehicle;
the one or more processors configured to:
obtain, based on a current location of the vehicle, a plurality of attributes comprising a time of day, weather, an event in a vicinity, or a demographic associated with the location of the vehicle;
determine a second location having a second plurality of attributes similar to the plurality of attributes;
obtain an advertisement that has been determined to a second effectiveness greater than a threshold at the second location; and
display the advertisement at the current location.

3. The system of claim 1, the one or more processors configured to:
obtain a speed of the vehicle when a person is looking at the display member;
perform a low-pass filter of the speed of the vehicle represented over a period of time;
segment the period of time into a plurality of periods wherein a speed of the vehicle in a period in the plurality of periods is within a first range or an acceleration of the vehicle in the period in the plurality of periods is within a second range; and
determine the period in the plurality of periods during which the effectiveness of the displayed advertisement was greater than a threshold.

4. A system comprising:
a moving object comprising:
a display member secured to the moving object and configured to display an image;
an imaging device secured to the moving object and disposed proximate to the display member, the imaging device to record an environment surrounding the display member; and
one or more processors configured to:
analyze a recording made by the imaging device to determine a total number of people having a line of sight access to the display member and a portion of the total number of people having the line of sight access to the display member who are looking at the display member; and
determine an effectiveness of the image based on the total number of people having the line of sight access to the display member and the portion of the total number of people looking at the display member.

5. The system of claim 4, wherein the one or more processors are part of an embedded system within the moving object, wherein the embedded system is configured to measure the effectiveness of the image when the embedded system is off-line.

6. The system of claim 4, the one or more processors configured to:
receive a plurality of consecutive recordings of the environment surrounding the display member;
track a person in the plurality of consecutive recordings; and
determine when the person is looking at the display member to determine the effectiveness of the image.

7. The system of claim 6, comprising the one or more processors configured to count as a single impression the person continually looking at the display member in a portion of the plurality of consecutive recordings.

8. The system of claim 4, comprising a solar panel to power the one or more processors.

9. The system of claim 4, comprising a locator to determine a location of the moving object.

10. The system of claim 9, the one or more processors configured to:
obtain, based on the location of the moving object, an attribute comprising a time of day, weather, an event in a vicinity, or a demographic associated with the location of the moving object; and
correlate the attribute to the effectiveness of the image.

11. The system of claim 10, the one or more processors configured to:
obtain a speed of the moving object when a person is looking at the display member; and
inversely correlate the speed of the moving object to the effectiveness of the image.

12. The system of claim 9, the one or more processors configured to:
obtain, based on a current location of the moving object, a plurality of attributes comprising a time of day, weather, an event in a vicinity, or a demographic associated with the location of the moving object;
determine a second location having a second plurality of attributes similar to the plurality of attributes;
obtain an image that has been determined to have a second effectiveness greater than a threshold at the second location; and
display the image at the current location.

13. The system of claim 9, the one or more processors configured to:
obtain, based on the location of the moving object, a plurality of attributes comprising a time of day, weather, an event in a vicinity, or a demographic associated with the location of the moving object;
upon determining that the effectiveness of the image is less than a threshold vary an attribute in the plurality of attributes until the effectiveness of the image is greater than the threshold or all of the plurality of attributes have been varied; and when all the plurality of attributes have been varied and the effectiveness of the image is less than the threshold, remove the image from the display member.

14. A method comprising:

displaying, by a display member secured to a moving object, an image;

recording, by an imaging device secured to the moving object and disposed proximate to the display member, an environment surrounding the display member;

analyzing, by a machine learning model, a recording made by the imaging device to determine a total number of people having a line of sight access to the display member and a portion of the total number of people having the line of sight access to the display member who are looking at the display member, wherein analyzing the recording comprises executing the machine learning model on the recording, the machine learning model trained for identifying persons and a direction of gaze; and determining, by one or more processors, an effectiveness of the image based on the total number of people having the line of sight access to the display member and the portion of the total number of people looking at the display member.

15. The method of claim 14, wherein the moving object is off-line and wherein the recording comprises a plurality of recordings, the method comprising:

tracking, by the one or more processors, a person in the plurality of recordings to determine a gaze direction of the person when the moving object is off-line; and when the gaze direction of the person points in a direction of the display member, counting, by the one or more processors, the person as a member of the portion of the total number of people having the line of sight access to the display member who are looking at the display member.

16. The method of claim 14, comprising:

receiving, by the one or more processors, a plurality of consecutive recordings of the environment surrounding the display member; and training, by the one or more processors, the machine learning model to identify a person and a direction of the person's gaze in the plurality of consecutive recordings having an amount of motion coherence below a threshold and under varying lighting conditions.

17. The method of claim 14, comprising:

determining, by the one or more processors, when a person looks at the display member more than once;

estimating, by the one or more processors, a demographic associated with the person based on a location of the person, an appearance of the person, a time of day, weather, or an event in a vicinity; and recording, by the one or more processors, an indication that the effectiveness of the image is greater than a threshold with the demographic.

18. The method of claim 14, comprising:

determining, by the one or more processors, a location of the moving object;

obtaining, by the one or more processors and based on the location of the moving object, a plurality of attributes comprising a time of day, weather, an event in a vicinity, or a demographic associated with the location of the moving object; and determining, by the one or more processors, how the effectiveness of the image varies with the plurality of attributes.

19. The method of claim 14, comprising:

determining a current location of the moving object;

obtaining, by the one or more processors and based on the current location of the moving object, a plurality of attributes comprising a time of day, weather, an event in a vicinity, or a demographic associated with the current location of the moving object;

determining, by the one or more processors, a second location having a second plurality of attributes similar to the plurality of attributes;

obtaining, by the one or more processors, an image that has been determined to have a second effectiveness greater than a threshold at the second location; and displaying, by the one or more processors, the image at the current location.

20. The method of claim 14, comprising:

obtaining, by the one or more processors and based on a location of the moving object, a plurality of attributes comprising a time of day, weather, an event in a vicinity, or a demographic associated with the location of the moving object;

upon determining that the effectiveness of the image is less than a threshold, varying, by the one or more processors, an attribute in the plurality of attributes until the effectiveness of the image is greater than the threshold or all of the plurality of attributes have been varied; and when all the plurality of attributes have been varied and the effectiveness of the image is less than the threshold, removing, by the one or more processors, the image from the display member.

\* \* \* \* \*